US010073673B2

United States Patent
Brancovici et al.

(10) Patent No.: US 10,073,673 B2
(45) Date of Patent: Sep. 11, 2018

(54) METHOD AND SYSTEM FOR ROBUST TAGGING OF NAMED ENTITIES IN THE PRESENCE OF SOURCE OR TRANSLATION ERRORS

(71) Applicant: Samsung Electronics Co., Ltd., Suwon-si, Gyeonggi-do (KR)

(72) Inventors: George Brancovici, Dallas, TX (US); Gabriel Nicolae, Dallas, TX (US); Hiep Luong, Plano, TX (US); Sindhu Vijaya-Raghavan, Los Gatos, CA (US); Yonghoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 14/330,888

(22) Filed: Jul. 14, 2014

(65) Prior Publication Data
US 2016/0012020 A1    Jan. 14, 2016

(51) Int. Cl.
*G06F 17/21* (2006.01)
*G06F 3/16* (2006.01)
(Continued)

(52) U.S. Cl.
CPC ............ *G06F 3/167* (2013.01); *G06F 17/278* (2013.01); *G06F 17/2735* (2013.01); *G06F 17/2785* (2013.01); *G10L 15/1815* (2013.01)

(58) Field of Classification Search
CPC ........... G06F 17/2785; G06F 17/30864; G06F 17/218
See application file for complete search history.

(56) References Cited

U.S. PATENT DOCUMENTS

| 7,925,610 B2 * | 4/2011 | Elbaz ................ G06F 17/30616 706/55 |
| 8,452,778 B1 * | 5/2013 | Song .................. G06K 9/00711 704/233 |

(Continued)

FOREIGN PATENT DOCUMENTS

WO     WO 2005/020091 A1    3/2005

OTHER PUBLICATIONS

Fahmy, Aly, and Amin Allam. "An Arabic-Disambiguating Engine Based on Statistical Approaches." 5th International Conference on Informatics and Systems (INFOS), Cairo University, p. 235-246, Giza, Egypt. 2007, pp. 1-13.*

(Continued)

*Primary Examiner* — Douglas Godbold
*Assistant Examiner* — Mark Villena

(57) ABSTRACT

A system includes a storage device configured to store a plurality of named entities collected from a plurality of sources, tokenized, and associated with a label. The system includes a tagging apparatus configured to receive textual communications, identify each of the textual communications, tokenize the textual communications, match the textual tokens with the named entities tokens stored in the storage device in order to assign the textual tokens to the labels associated with the named entity tokens, tag the textual communications based on the matching between the textual tokens and the named entity tokens in order to identify the intended meaning of each of the textual communications, and identify the intended meaning of the textual communications based on applying the tags to the textual communications. A method capable of disambiguating named entities using a common sense reasoning approach is also disclosed.

20 Claims, 11 Drawing Sheets

(51) Int. Cl.
   *G06F 17/27* (2006.01)
   *G10L 15/18* (2013.01)

(56) References Cited

U.S. PATENT DOCUMENTS

| | | | |
|---|---|---|---|
| 2003/0191625 A1 | 10/2003 | Gorin et al. | |
| 2004/0243554 A1* | 12/2004 | Broder | G06F 17/30613 |
| 2004/0243556 A1* | 12/2004 | Ferrucci | G06F 17/30622 |
| 2004/0243560 A1* | 12/2004 | Broder | G06F 17/30622 |
| 2005/0080613 A1* | 4/2005 | Colledge | G06F 17/2785 |
| | | | 704/9 |
| 2007/0016400 A1* | 1/2007 | Soricutt | G06F 17/27 |
| | | | 704/9 |
| 2007/0136246 A1* | 6/2007 | Stenchikova | G06F 17/279 |
| 2009/0019032 A1 | 1/2009 | Bundschus et al. | |
| 2009/0216799 A1* | 8/2009 | Manjrekar | G06F 17/30306 |
| 2010/0050074 A1* | 2/2010 | Nachmani | G06F 17/273 |
| | | | 715/257 |
| 2011/0035210 A1 | 2/2011 | Rosenfeld et al. | |
| 2013/0067319 A1* | 3/2013 | Olszewski | G06F 17/218 |
| | | | 715/234 |
| 2013/0268262 A1* | 10/2013 | Moilanen | G06F 17/28 |
| | | | 704/9 |
| 2014/0040275 A1* | 2/2014 | Dang | G06F 17/2785 |
| | | | 707/741 |
| 2014/0163951 A1 | 6/2014 | Nikoulina et al. | |
| 2014/0324808 A1* | 10/2014 | Sandhu | G06F 17/2785 |
| | | | 707/706 |

OTHER PUBLICATIONS

International Search Report, dated Jul. 30, 2015, in connection with International Application No. PCT/KR2015/004770, 3 pages.
Written Opinion of the International Searching Authority, dated Jul. 30, 2015, in connection with International Application No. PCT/KR2015/004770, 9 pages.

* cited by examiner

| Label Information | | |
|---|---|---|
| Named entity name | Named entity class | Further information (e.g. reputation etc.) |
| Prince Rogers Nelson | Musician | ... |

| Named entity alias | Named entity name | Named entity class | Further information (e.g. reputation etc.) |
|---|---|---|---|
| Prince | Prince Rogers Nelson | Musician | ... |

| Token | Token Id | Token Encoding 1 | ... | Token Encoding n |

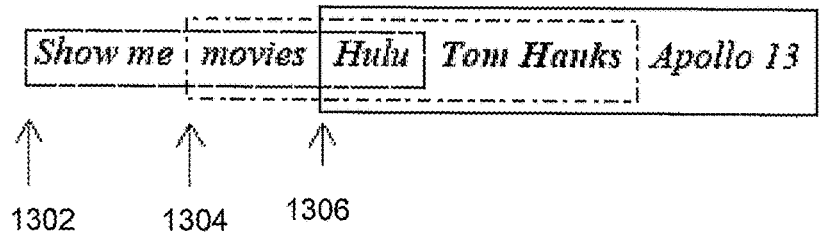
FIG. 13
hulu — IsA → company
hulu — IsA → organization
hulu — AtLocation → unite state
apollo 13 — IsA → space mission
apollo 13 — IsA → film
apollo 13 — IsA → creative work
FIG. 14
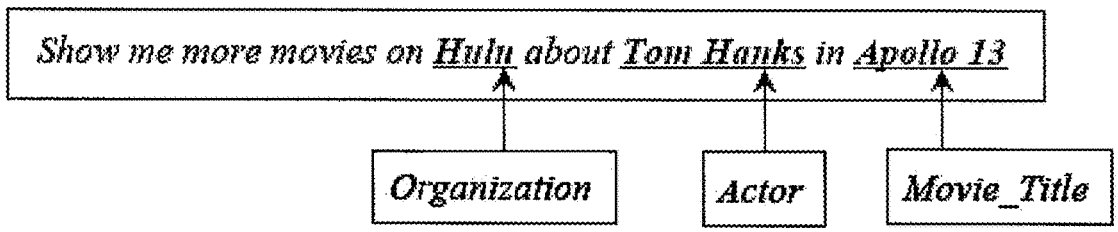
FIG. 15

METHOD AND SYSTEM FOR ROBUST TAGGING OF NAMED ENTITIES IN THE PRESENCE OF SOURCE OR TRANSLATION ERRORS

TECHNICAL FIELD

The present application relates generally to electronic devices and, more specifically, to textual interpretations using an electronic device.

BACKGROUND

Certain electronic devices employ voice-enabled user interfaces for the Human Computer Interaction. A natural language usage is becoming the interaction method of choice with certain electronic devices and appliances. A smooth transition from natural language to the intended interaction can play an increasingly important role in consumer satisfaction.

SUMMARY

In a first embodiment, a robust named entity tagging system capable of identifying an intended meaning of a communication source regardless of the source or translation errors is disclosed. The system includes a storage device configured to store a plurality of named entities collected from a plurality of sources. Each of the named entities are tokenized into a common format of named entity tokens. Each of the named entities is associated with a label. Each of the named entity tokens are one of a word or a syllable of a word. The system also includes a tagging apparatus configured to receive one or more textual communications. The tagging apparatus is also configured to identify each of the one or more textual communications. The tagging apparatus is further configured to tokenize the one or more textual communications into a common format of textual tokens. The tagging apparatus is configured to match the one or more textual tokens with one or more of the named entities tokens stored in the storage device in order to assign the textual tokens to the labels associated with the named entity tokens. The tagging apparatus is further configured to tag the one or more textual communications based on the matching between the textual tokens and the named entity tokens in order to identify the intended meaning of each of the one or more textual communications. The tagging apparatus is configured to identify the intended meaning of the one or more textual communications based on applying the tags to the one or more textual communications.

In a second embodiment, a method implemented in a robust named entity tagging system capable of identifying an intended meaning of a communication source regardless of the source or translation errors is disclosed. The method includes receiving, by a tagging apparatus, one or more textual communications. The method also includes identifying each of the one or more textual communication. The method further includes tokenizing the one or more textual communications into a common format of textual tokens. The method includes matching the one or more textual tokens with one or more named entities tokens stored in a storage device in order to assign the textual tokens to labels associated with the named entity tokens. Each of the one or more named entities is associated with a label. The method also includes tagging the one or more textual communications based on the matching between the textual tokens and the named entity tokens in order to identify the intended meaning of each of the one or more textual communications. The method further includes identifying the intended meaning of the one or more textual communications based on applying the tags to the one or more textual communications.

In a third embodiment, a method for use in an electronic device and capable of disambiguating named entities is disclosed. The method includes receiving textual communication by an electronic device. The textual communication includes one or more named entities. The method also includes grouping concepts associated with the one or more name entities in order to extract relevant information from a knowledge base. The method further includes inferring relevant information from the extracted relevant information from the knowledge base. The method includes calculating and ranking the inferred relevant knowledge for the one or more named entities. The method also includes identifying the most relevant label based on the highest rank of inferred relevant knowledge for each of the one or more named entities.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls' at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example of a sliding concept window that can be used to extract relevant knowledge or information from a sentence according to this disclosure;

FIG. 14 illustrates examples of common sense knowledge that are extracted from a common sense knowledge base according to this disclosure;

FIG. 15 illustrates an example of an expected output of the disambiguation process according to this disclosure;

DETAILED DESCRIPTION

FIGS. 1A through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following documents and standards descriptions are hereby incorporated into the present disclosure as if fully set forth herein: U.S. Pat. No. 6,975,766 B2, filed Sep. 7, 2001 (REF 1); U.S. Patent Application Publication No. 2008/0208864, filed on Feb. 26, 2007; U.S. Patent Application Publication No. 2003/0208354, filed on Aug. 26, 2002; and U.S. Patent Application Publication No. 2003/0208354, filed on Feb. 26, 2007. Each of which is hereby incorporated by reference into the present application as if fully set forth herein.

Figure 1A:
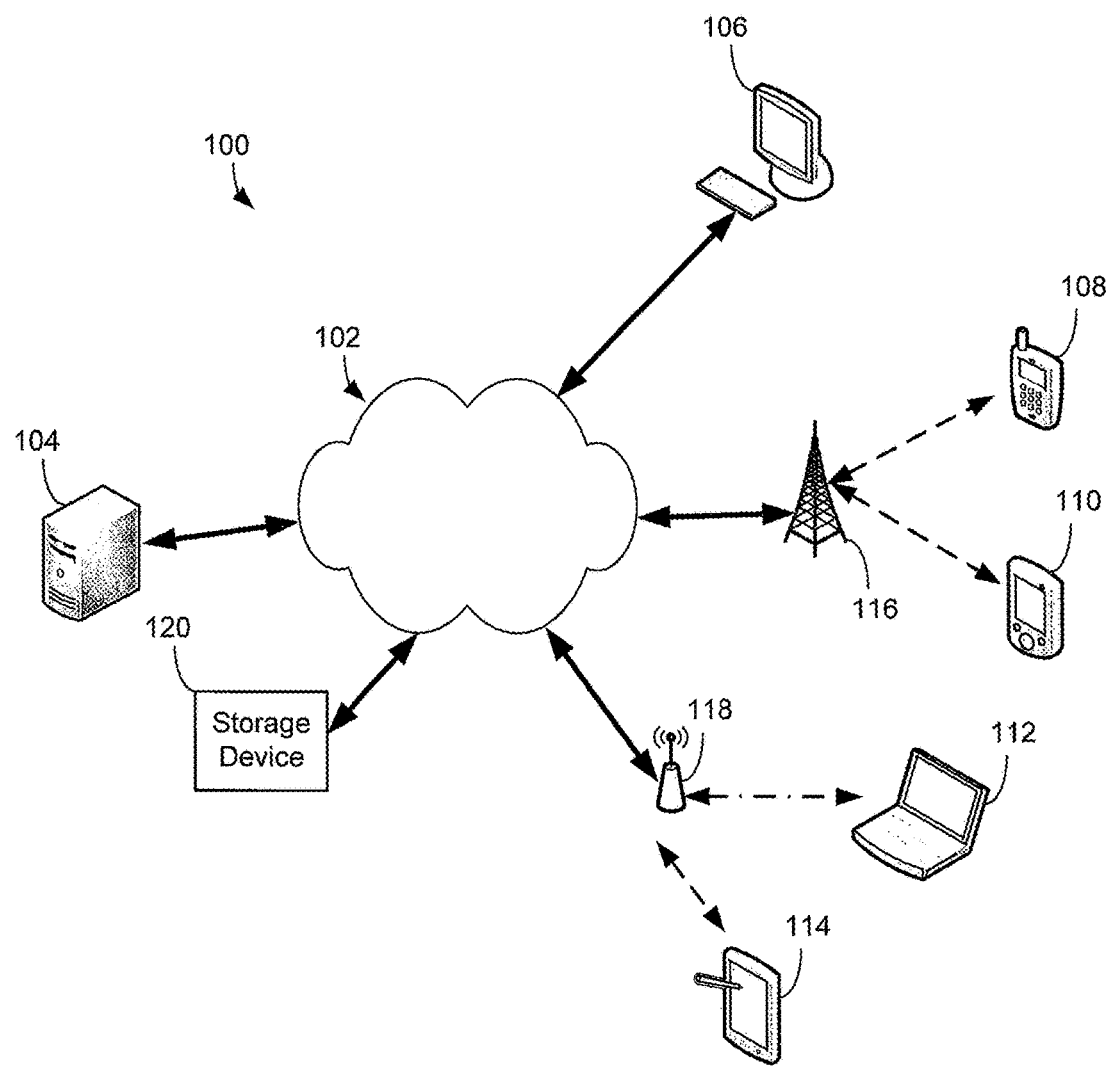
FIG. 1A illustrates an example computing system within which devices can implement robust tagging of named entities according to this disclosure.

FIG. 1A illustrates an example computing system 100 according to this disclosure. The embodiment of the computing system 100 shown in FIG. 1A is for illustration only. Other embodiments of the computing system 100 could be used without departing from the scope of this disclosure.

As shown in FIG. 1A, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. The network 102 can also facilitate communications between the various client devices 106-114 and cloud computing. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a television, a smart television, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

The example computing system 100 includes devices that can implement robust tagging of named entities according to this disclosure. The computing system 100 includes a storage device 120, which can be coupled by the network 102, such as the Internet and a wireless communication system including a base station (BS) 116, to one or more client devices 106-114, such as a smartphone 108, for matching tagged entity objects stored within the storage device 120 with entity objects received by the smartphone 108.

Although FIG. 1A illustrates one example of a computing system 100, various changes may be made to FIG. 1A. For example, the computing system 100 could include any number of each component in any suitable arrangement. In general, computing and communication systems come in a wide variety of configurations, and FIG. 1A does not limit the scope of this disclosure to any particular configuration. While FIG. 1A illustrates one operational environment in which various features disclosed in this patent document can be used, these features could be used in any other suitable system.

Figure 1B:
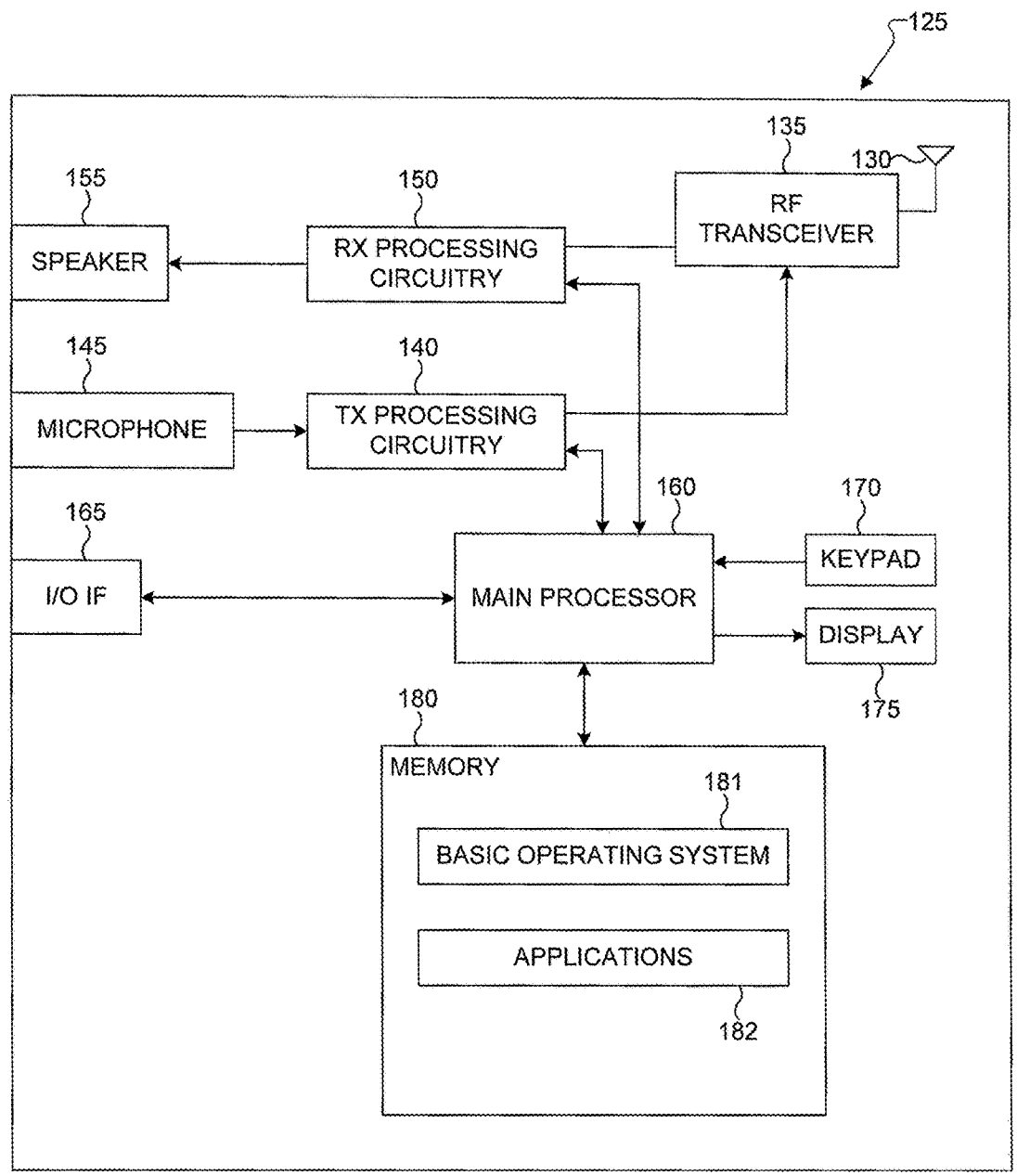
FIG. 1B illustrates an example client device 125 from the computing system of FIG. 1A within which robust tagging of named entities can be implemented according to this disclosure.

FIG. 1B illustrates an example client device 125 from computing system 100 of FIG. 1A within which robust tagging of named entities can be implemented according to this disclosure. The client device 125 could represent one or more of the client devices 106-114 in FIG. 1A.

As shown in FIG. 1B, the client device 125 includes an antenna 130, a radio frequency (RF) transceiver 135, transmit (TX) processing circuitry 140, a microphone 145, and receive (RX) processing circuitry 150. The client device 125 also includes a speaker 155, a main processor 160, an input/output (I/O) interface (IF) 165, a keypad 170, a display 175, and a memory 180. The memory 180 includes a basic operating system (OS) program 181 and one or more applications 182.

The RF transceiver 135 receives, from the antenna 130, an incoming RF signal transmitted by another component in a system. The RF transceiver 135 down-converts the incoming RF signal to generate an intermediate frequency (IF) or baseband signal. The IF or baseband signal is sent to the RX processing circuitry 150, which generates a processed baseband signal by filtering, decoding, and/or digitizing the baseband or IF signal. The RX processing circuitry 150 transmits the processed baseband signal to the speaker 155 (such as for voice data) or to the main processor 160 for further processing (such as for web browsing data).

The TX processing circuitry 140 receives analog or digital voice data from the microphone 145 or other outgoing baseband data (such as web data, e-mail, or interactive video game data) from the main processor 160. The TX processing circuitry 140 encodes, multiplexes, and/or digitizes the outgoing baseband data to generate a processed baseband or IF signal. The RF transceiver 135 receives the outgoing processed baseband or IF signal from the TX processing circuitry 140 and up-converts the baseband or IF signal to an RF signal that is transmitted via the antenna 130.

The main processor 160 can include one or more processors or other processing devices and execute the basic OS program 181 stored in the memory 180 in order to control the overall operation of the client device 125. For example, the main processor 160 could control the reception of forward channel signals and the transmission of reverse channel signals by the RF transceiver 135, the RX processing circuitry 150, and the TX processing circuitry 140 in accordance with well-known principles. In some embodiments, the main processor 160 includes at least one microprocessor or microcontroller.

The main processor 160 is also capable of executing other processes and programs resident in the memory 180, such as operations for robust tagging of named entities. The main processor 160 can move data into or out of the memory 180 as required by an executing process. In some embodiments, the main processor 160 is configured to execute the applications 182 based on the OS program 181 or in response to signals received from external devices or an operator. The main processor 160 is also coupled to the I/O interface 165, which provides the client device 125 with the ability to connect to other devices such as laptop computers and handheld computers. The I/O interface 165 is the communication path between these accessories and the main processor 160. The memory 180 coupled to the main processor 160 can store a phrase dictionary, prefix tree, a token lexicon, and the like.

The main processor 160 is also coupled to the keypad 170 and the display unit 175. The operator of the client device 125 can use the keypad 170 to enter data into the client device 125. The display 175 may be a liquid crystal display or other display capable of rendering text and/or at least limited graphics, such as from web sites. The main processor 160 can control content that is presented on the display unit 175. The main processor 160 and other components within the user device 125 can be powered by a battery or other power source that can be recharged by an external power source or can be powered by an external power source.

Figure 2:
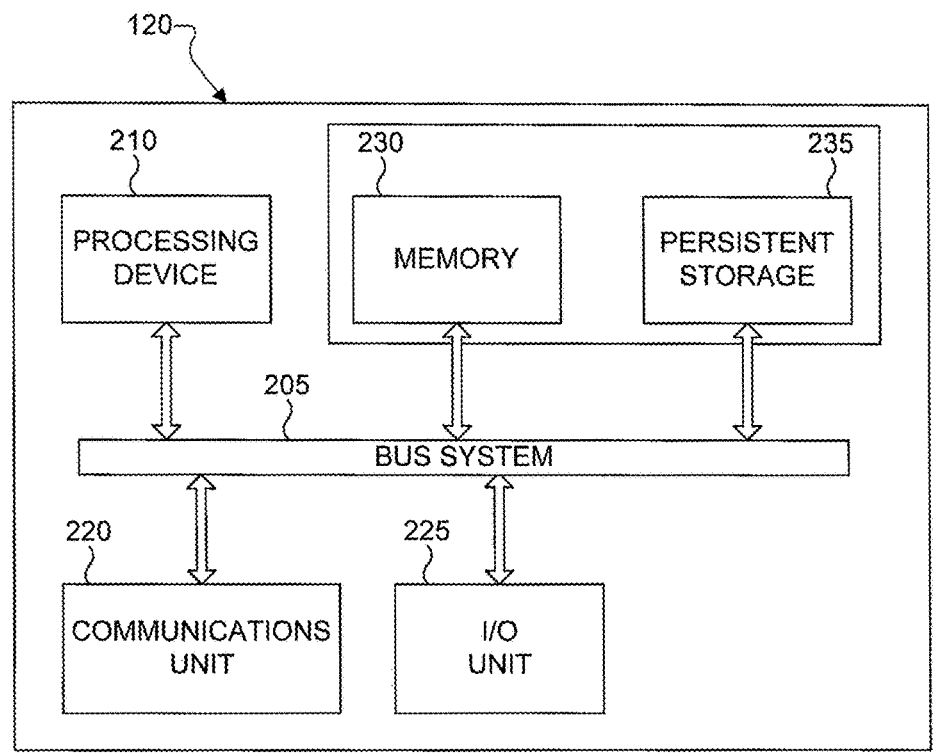
FIG. 2 illustrates an example high level block diagram of a storage device according to this disclosure.

FIG. 2 illustrates an example device in a computing system according to this disclosure. In particular, FIG. 2 illustrates an example high level block diagram of storage device 120 from the computing system 100 of FIG. 1A within which robust tagging of named entities can be implemented according to this disclosure. As shown in FIG. 2, the storage device 200 includes a bus system 205, which can be configured to support communication between at least one processing device 210, at least one memory 230, at least one communications unit 220, and at least one input/output (I/O) unit 225.

The processing device 210 is configured to execute instructions that can be loaded into a memory 230. The server 200 can include any suitable number(s) and type(s) of processing devices 210 in any suitable arrangement. Example processing devices 210 can include microprocessors, microcontrollers, digital signal processors, field programmable gate arrays, application specific integrated circuits, and discrete circuitry. The processing device(s) 210 can be configured to execute processes and programs resident in the memory 230, such as operations for generating display adaptation metadata.

The memory 230 and a persistent storage 235 can represent any structure(s) capable of storing and facilitating retrieval of information (such as data, program code, or other suitable video information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc. The memory 230 and the persistent storage can be configured to store named entities and a prefix tree as to be disclosed further herein.

The communications unit 220 is configured to support communications with other systems or devices. For example, the communications unit 220 can include a network interface card or a wireless transceiver facilitating communications over the network 103. The communications unit 220 can be configured to support communications through any suitable physical or wireless communication link(s).

The I/O unit 225 is configured to allow for input and output of data. For example, the I/O unit 225 can be configured to provide a connection for user input through a keyboard, mouse, keypad, touchscreen, or other suitable input device. The I/O unit 225 can also be configured to send output to a display, printer, or other suitable output device.

Although FIGS. 1B and 2 illustrate examples of devices in a computing system, various changes may be made to FIGS. 1B and 2. For example, various components in FIGS. 1B and 2 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 1B illustrates the client device 125 configured as a mobile telephone or smartphone, client devices could be configured to operate as other types of mobile or stationary devices. In addition, as with computing and communication networks, client devices and servers can come in a wide variety of configurations, and FIGS. 1B and 2 do not limit this disclosure to any particular client device or server.

As natural language becomes the interaction method of choice with electronic devices and appliances, the smooth transition from natural language to the intended interaction can play an increasingly important role in consumer satisfaction. A major task within this transition is the identification of what a user or author actually intends (such as in terms of actions and action parameters/targets) based on textualized communication. For example, spoken language converted into text can be the result of a sequence of processing steps that include voice capturing, Automatic Speech Recognition (ASR), tokenization, named entity tagging, concept analysis, semantic analysis, goal detection, and the like. Sources of textualized communication can include spoken user utterances, printed text, user typed texted, user handwriting, and the like. ASR, Optical Character Recognition (OCR), and the like, can be used to textualize communication sources. It should be understood that while the term "communication" can include transmitting information from one device to another device, the term "communication" can also refer to any medium that can be communicated. For example, communication can include speaking, text, written language, or the like, regardless of whether it is transferred anywhere or not.

Tagging named entities can include recognizing domain-relevant entities in a text and tagging (such as associating or linking) each of the entities with appropriate identifying information. Identifying information can include class labels and the like. Recognizing named entities can imply their detection in the text, classification, and identification (such as disambiguation). Tagging named entities (such as movie titles, athletes, actors, landmarks, and the like) can be important in many fields dealing with textual understanding and processing (such as natural language understanding), as the named entities can be the subjects or targets of action and therefore contain vital information. Tagging can be useful when the sentences in the text are particularly short (such as textual translations of human control commands for electronic devices) or when the sentences in the text have a proportionally large number of named entities.

Potential named entities in a sentence can contain multiple words, can overlap, and can even be included in one another. For example, the sentence, "Show me a documentary about the making of Safe House" can contain at least three named entities (such as "the making of safe house," "safe house," and "house") associated with the same label "show."

Figure 3:
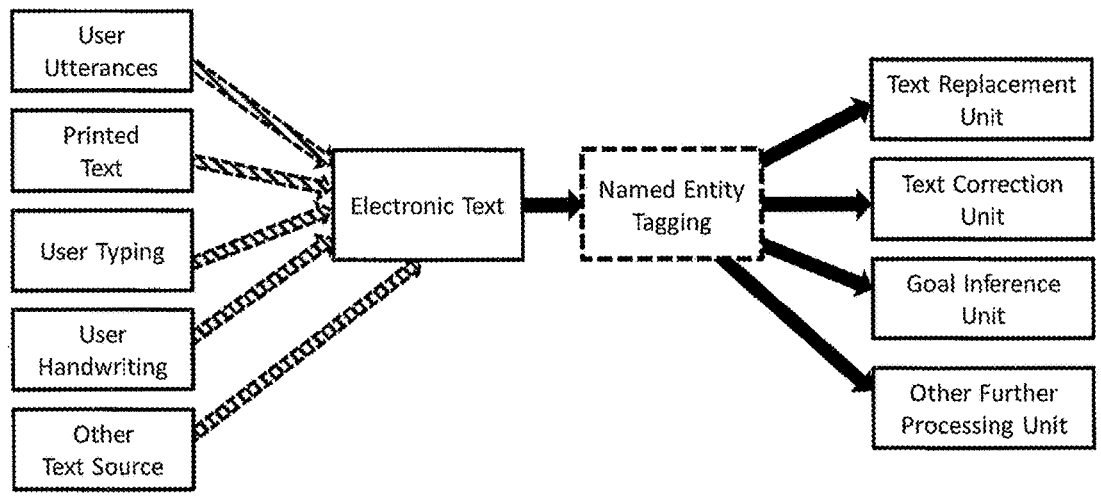
FIG. 3 illustrates an example diagram of a named entity tagging function according to this disclosure.

Within a natural language understanding pipeline, both ASR (or OCR) and the tagging of named entities can occur in the early stages and their results can have a great influence over the success of the rest of the pipeline. Depending upon the system type of which the natural language understanding pipeline is embedded, determining, for example, what a user or speaker intends from textual language converted from spoken language can allow the pipeline to proceed without having to assess and correct each and every textual word in the utterance. For example, if a speaker or user were to utter the sentence, "I want to watch Harry Potter and the Philosopher's Stone", and a voice to text conversion process were to textualize the utterance with the phrase "I want two wash Harry Potter and the Philosopher's Stone", once the real movie title ("Harry Potter and the Philosopher's Stone") is tagged, a simple correction mechanism can identify the correct action ("watch"). In this case, the user's intention can be directly inferred and fulfilled, without necessarily having to correct the word "two" as well. Depending upon the context, the results of the tagging will be used for various purposes, including, but not limited to, direct correction by replacement, further related corrections, inference of a user's goals, and the like. FIG. 3 illustrates an example diagram of a named entity tagging function according to this disclosure. In the example shown in FIG. 3, one or more of user utterances, printed text, user typing, user handwriting, or another text sources are converted to electronic text. From the electronic text, a named entity is tagged and forwarded to one or more of: a text replacement unit; a text correction unit; a goal inference unit; or another further processing unit. The embodiment of the named entity tagging functions shown in FIG. 3 is for illustration only. Other embodiments could be used without departing from the scope of the present disclosure.

Figures 4, 6:
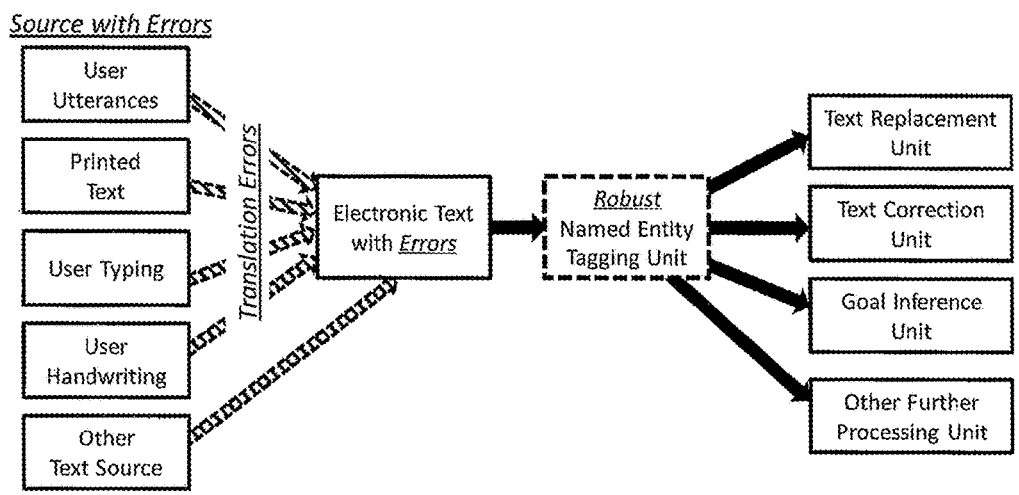
FIG. 4 illustrates an example diagram of a robust named entity tagging function according to this disclosure.
FIG. 6 illustrates an example diagram for writing, or storing, named entities derived from the raw named entities in the phrase dictionary according to this disclosure.

While techniques (such as ASR, OCR, and the like) can be used to translate a communication source into text, further processing steps in the natural language processing pipeline used to analyze and understand the communication can be hindered by errors in the text. Source and translation errors in the text can be a result of issues in the acoustic and language models (such as through hardware limitations), background noise, a particular user's pronunciation anomalies, a particular user's discourse style, a particular user's general language skills, improper tokenization, wrong or inadequate spelling or grammar, printed text, typing errors, translation errors, ASR process errors, OCR process errors, a combination thereof, and the like. FIG. 4 illustrates an example diagram of a robust named entity tagging system according to this disclosure. In the example shown in FIG. 4, sources with errors such as one or more of user utterances, printed text, user typing, user handwriting, or text from another sources are converted to electronic text, conversion which can also produce the errors. From the electronic text with errors, one or more named entities can be robustly tagged by a robust named entity tagging unit and forwarded to one or more of: a text replacement unit; a text correction unit; a goal inference unit; or another further processing unit. The embodiment of the named entity tagging functions shown in FIG. 4 is for illustration only. Other embodiments could be used without departing from the scope of the present disclosure.

Errors in one or more words in an utterance (such as when "house" is misrecognized as "haus") can result in many named entities not being tagged at all or being mistakenly tagged. A robust named entity tagging function configured to detect all named entities of a text regardless of source and translation errors can improve the effectiveness of a natural language understanding pipeline by identifying what a user or author actually intends. For example, when the translated text contains a sizeable number of named entities, a robust named entity tagging function can help correct OCR or ASR results, spelling and grammar errors, and the like, depending on the context.

Many named entities can have limited context-anchoring and an above average perplex characteristic, such as by having a large number of alternative meanings even at a particular position with text or a sentence, by having different meanings in different languages, by not being easy to infer from the surrounding words, by being of a different language, and the like. Many named entities can also be or contain various other parts of speech in addition to proper nouns or even nouns in general, nouns which could be used as clues for a simplistic named entity detection. For sentences containing such named entities, applying language model information or traditional pattern matching to detect named entities and especially to correct source and translation errors may not provide adequate corrections for named entities and for sentences according to the intent of the user or author.

Conversely, by tagging named entities using robust methods, as disclosed herein, the rest of the sentence can be corrected using traditional methods, if necessary. In many cases, possible corrections for other essential portions of the sentence such as the action itself can become much more obvious when the named entities (such as action targets) are known, so that the named entity tagging can end up supporting the correction processes instead of vice versa. For example, with the ASR output "I want to wash Harry Potter and the Philosopher's Stone" once the real movie title has been identified, it can become obvious that the word "wash" should be replaced or corrected with the more appropriate "watch."

As disclosed herein, systems and methods for tagging (such as by detection, classification, identification, association, a combination of, and the like) one or more named entities from a given domain within a sentence regardless of source or translation errors can be used to provide or identify the intent of the communication source. Additionally, the systems and methods as disclosed herein can be applied to any contiguous textual sentence or set of sentences resulting from ASR, OCR, and the like, regardless of ASR errors, OCR errors, user errors, and the like.

Figure 5:
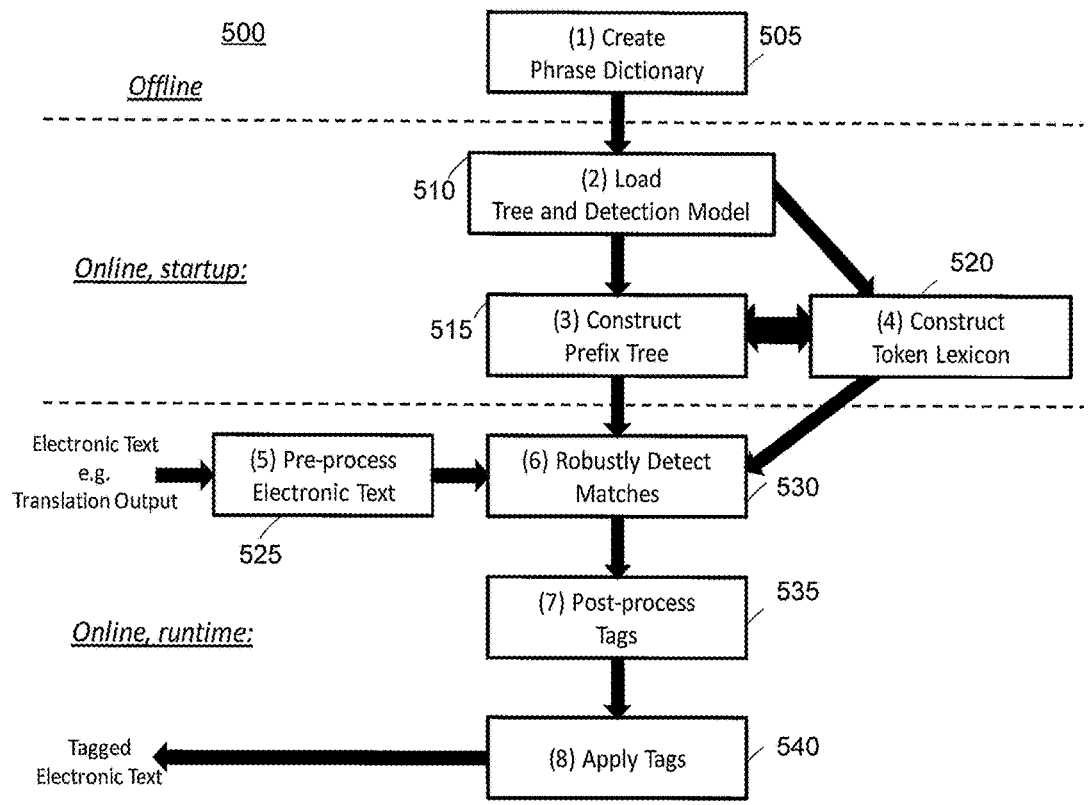
FIG. 5 illustrates an example flowchart illustrating a robust tagging process according to this disclosure.

In certain embodiments, the systems used to implement the methods as disclosed herein include a robust tagging system with a storage device. FIG. 5 illustrates an example flowchart illustrating a robust tagging method 500 according to this disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

At step 505, a phrase dictionary can be created in the storage device by including a plurality of raw named entities (such as words, names, phrases, and the like) collected from a plurality of existing sources. For example, raw named entities or raw phrases from different sources can be processed resulting in a large, consistent set of named entities in a named entity dictionary. It should be understood that while raw named entities can include words, names, phrases, and the like, raw named entities may not include every word so as to minimize the search time when a named entity received by the apparatus is to be matched with a named entity stored in the phrase dictionary as will be discussed further herein. In an embodiment, raw named entities can include object names, names associated with objects or people, proper names associated with objects or people, titles, phrases (such as commonly used phrases), a combination thereof, and the like.

FIG. 6 illustrates an example diagram for writing, or storing, named entities derived from the raw named entities, in a phrase dictionary according to this disclosure. The embodiment of the diagram shown in FIG. 6 is for illustration only. Other embodiments could be used without departing from the scope of the present disclosure.

The raw named entities can be converted to named entities by associating each of the raw named entities with label information (such as one or more labels or further information) from the existing sources, normalizing the raw named entities, and tokenizing them into a common format. In certain embodiments, tokenization of raw named entities includes breaking text into individual words or individual syllables of a word. In certain embodiments, information about aliases of named entities is collected from existing sources and associated with the collected named entities.

At step 510, a tree and detection model are loaded into the storage device with the phrase dictionary. The named entities stored in the phrase dictionary can be clustered in a prefix tree structure having parent nodes and child nodes stemming from the parent nodes. The clustered structure can include a predetermined depth limiting the number of child nodes associated with a particular parent node that can be linked in series. In an embodiment, the predetermined depth can define the maximal number of intermediary clustering levels between a node and its children in the prefix tree. Other limiting parameters can be used to limit the maximum number of elements in a cluster before the cluster is broken into finer clusters. The direct child nodes of a common parent in the prefix tree dimension can appear as leaves or ends in the "local" clustering structure dimension. In an embodiment, local can mean that it only concerns a parent and its children. At each cluster level (such as the parent level, a first child nodes level linked directly to the parent, a second child node level linked directly to the first child node level, and the like) a set of encoding (such as hashing) functions can be used to cluster named entities that favor collisions (such as phonetic encoding function, classic encoding functions with increasing code length, extended encoding functions with vocals and increasing code length, two-level usage of the classic or extended encoding functions applied on the token and on the reversed token, and the like). In an embodiment, there can be two distinct dimensions/views: the "prefix tree" dimension and the "clustering tree" dimension. In the first phase, the prefix tree can contain tokens (such as words) connected through "next-token" links as they appear in named entities, so that any path from the root to a leaf represents a named entity. In an embodiment, different named entities can share the same prefix and thus the name. In an embodiment, named entities can end in an internal node, such as when a named entity is a subsequence of another.

In the second phase, the prefix tree can be augmented with fail links. In the third phase, each parent-child (such as "next-token") relationship in the prefix tree can be analyzed. If certain thresholds are exceeded, such as a large number of named entities that share the same prefix up to the current node/token but differ from the next node/token onwards, then a local clustering can be employed. In an embodiment, there can be a direct relationship between a parent and its children. In an embodiment, a few intermediary levels of indirection up to a certain maximal depth can be created. To create these intermediary levels, the children of each parent with many children can be clustered, based on what they have in common as determined by the hashing function that favors collisions (such as common). A coarse clustering (such as a coarse hashing) can be used to determine several clusters on a first level. When the number of children in clusters is greater than a threshold, a more finely grained clustering (such as finer grained hashing) can be implemented to split those clusters on the first level into multiple clusters on the second level, and so on.

In certain embodiments, when the size of cluster exceeds a cluster size threshold, the depth of the prefix tree is increased to reduce the size of the cluster back to being below the cluster size threshold. In certain embodiments, the encoding functions at each level can be variants of the same function with appropriate parametrizable precision. In an embodiment, a similarity measure that functions as a refinement of the encoding function can be used to do the final selection within the clusters on the deepest level.

Figure 7A:
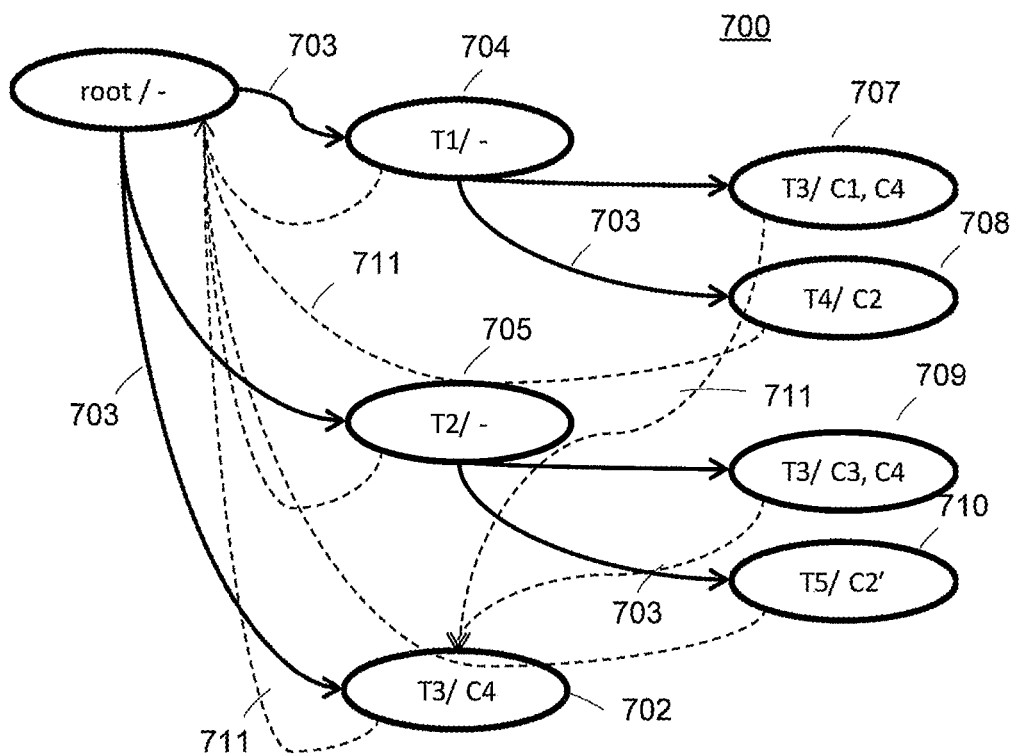
FIG. 7A illustrates an example diagram of a prefix tree according to this disclosure.
Figure 7B:
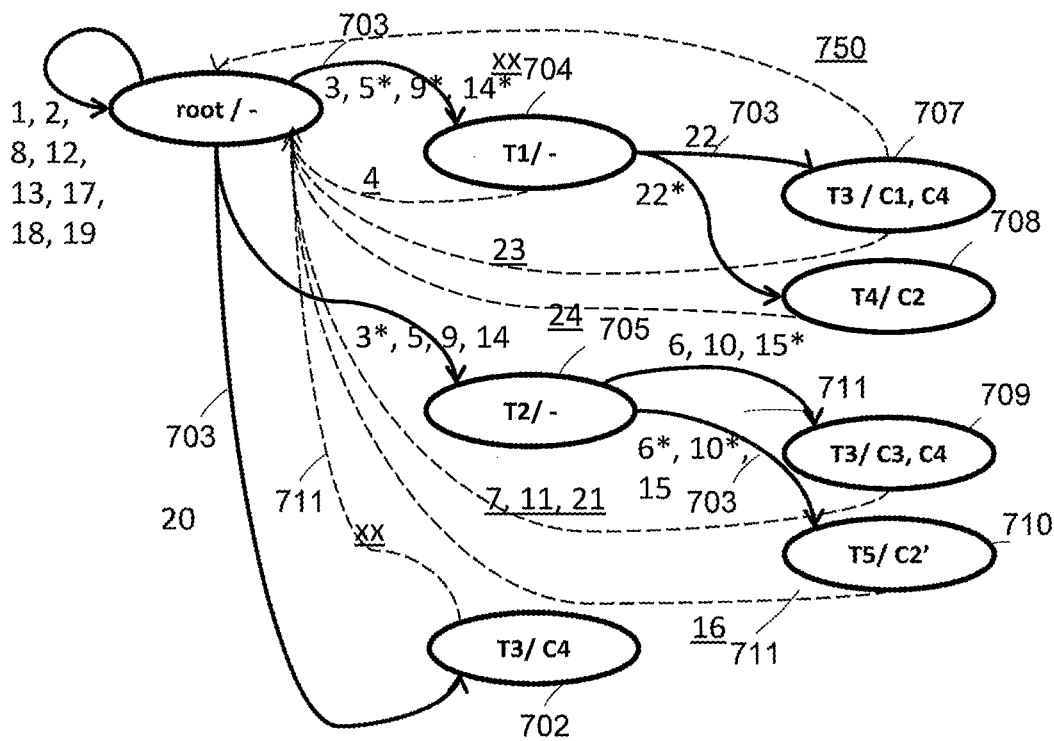
FIG. 7B illustrates an example diagram of a prefix tree with single forward steps and multiple backward steps according to this disclosure.

At step 515, a prefix tree is constructed in the storage device using the phrase dictionary based on an identifying part (such as an alias) of each named entity and augments each node corresponding to the end token of a named entity with the label information associated with it. FIG. 7A illustrates an example diagram of a prefix tree 700 according to this disclosure. FIG. 7B illustrates an example diagram of a prefix tree 750 with single forward steps and multiple backward steps according to this disclosure. The embodiments of the prefix trees shown in FIGS. 7A and 7B are for illustration only. Other embodiments could be used without departing from the scope of the present disclosure.

The prefix trees 700 and 750 can be constructed based on an identifying part (such as an alias) of each named entity and can augment each node corresponding to the end token of a named entity with the label information associated with it. The prefix trees 700 and 750 can include parent nodes (such as the root) 702 linked via next links 703 to one or more child nodes 704-710. The prefix tree also can include fail links 711 that allow resuming a search immediately after a failure, starting with the current suffix at the parent node 702. For simplicity, the tokens illustrated in FIGS. 7A and 7B are in the target node instead of the link itself. However, each of the next links can correspond to an individual token, representing a single word or a syllable of a word providing for approximate matching. Each unique token can be kept only once in the storage unit and the prefix tree simply references them thereby reducing the memory footprint.

By designating tokens with whole words or at least syllable of words instead of each individual character of a word, the prefix tree depth and the number of steps needed to detect a match can be minimized while also inherently avoiding the problem of mistakenly detecting short named entities that are only substrings of a longer word in the target sentence. Furthermore, using syllables as tokens can have the benefit of being less sensitive to tokenization errors in the utterance due to translation errors.

In certain embodiments, in order to create a prefix tree in the storage device, the following steps can be taken: (1) apply the internal tokenization function on the identifying part of the named entity; (2) add each token together with its encodings to the lexicon (to be addressed further herein); (3) iterate through each token and the corresponding tree node and append new child nodes when necessary; (4) perform a breadth first traversal of the prefix tree and create the fail links; and (5) create the clustering structures on top of the prefix tree.

In an embodiment, the prefix tree can initially be fully created including next and fail links. This can result in parent nodes having tens of thousands of children directly connected. Subsequently, when all children of each parent are known, the clustering structures can be created, resulting in an entire tree of much smaller clusters between a parent and its children. Other clustering strategies can also be implemented. For example, clustering strategies can include a variable depth and finer clustering taking place whenever a cluster becomes too large until perhaps a maximal level or with a fixed depth and all child nodes kept in clusters on the fixed, deepest level.

To create a clustering structure for a parent-children relationship in the prefix tree, all tokens represented by these children can be considered. For a given depth and for each token, the corresponding token encodings can be retrieved from the storage device or generated on-the-fly. The corresponding token encodings can be applied successively to select the most appropriate cluster to store this token on the deepest level. If no such exact child exists within this cluster, one can be added. Whenever no appropriate clusters are found, clusters can be appended (such as sequentially) to the corresponding clustering structure. Similarly, after appending the clusters, a corresponding child can be added to the cluster on the deepest level. In an embodiment, clusters can be broken dynamically into finer clusters whenever a determined cluster size is exceeded. This procedure is applied to all parent-child relationships in the prefix tree.

With robust approximate matching on utterances containing errors, multiple similar children can appear after a parent during the search that can lead to valid continuations of the traversal. All children can be considered so that a subset that is the most similar based on a similarity measure can be selected.

It should be noted that FIGS. 7A and 7B both illustrate prefix trees. For example, FIG. 7A can illustrate static links in the prefix tree, such as forward/next and backward/fail links. FIG. 7B can illustrate the dynamic search steps, which can be done by following the next and fail links in the tree. As shown in FIG. 7B, at each step of the search through the tree, not only can one perfect child node to continue the search be considered, but also multiple promising child nodes. The search can be continued with one of them and the rest can be set aside (such as in a stack). When all the resulting alternatives have been considered, one of the promising children put aside can be considered, then the next one can be considered, and etc.

Figures 8, 9:
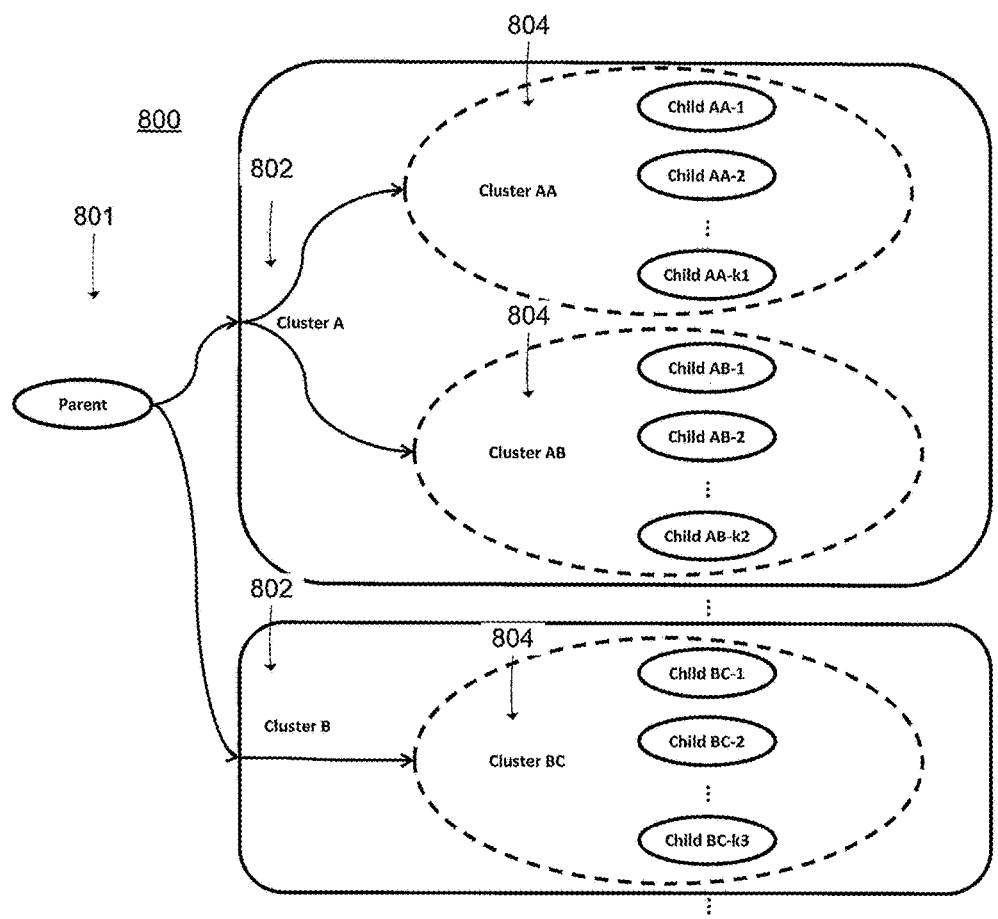
FIG. 8 illustrates an example diagram of a multi-level, harmonized clustering of children in a prefix tree structure according to this disclosure.
FIG. 9 illustrates an example entry of a token in the token lexicon to be used for mapping according to this disclosure.

FIG. 8 illustrates an example diagram of a multi-level, harmonized clustering structure 800 of the children of a node in a prefix tree according to this disclosure. The embodiment of the diagram shown in FIG. 8 is for illustration only. Other embodiments could be used without departing from the scope of the present disclosure. When the next token of a named entity is to be matched with similar tokens at the same position in named entities in the prefix tree, the multi-level, harmonized clustering of children can enable the fast selection of such similar next tokens by doing a quick descent from the parent node 801 (from the prefix tree) hosting the current token, throughout the cluster tree through 802 etc., towards the relevant deepest local cluster 804 containing child nodes (from the prefix tree) with similar candidate next tokens. A sequential search using a similarity that functions as a refinement of the hashing function can be used to further limit the selection.

At step 520, the token lexicon is created in the storage device. The token lexicon can be configured to map each token to an entry containing an integer ID and set of encodings according to the depth of the clustering structures.

FIG. 9 illustrates an example entry of a token in the token lexicon to be used for mapping according to this disclosure. The embodiment of the token entry shown in FIG. 9 is for illustration only. Other embodiments could be used without departing from the scope of the present disclosure.

When building the token lexicon, the tokens can be mapped to entries during the construction of the prefix tree. Since the same encoding can occur multiple times due to the expected collisions, the encodings can be kept in a secondary encoding lexicon and referenced from the token lexicon.

The robust tagging system can also include a robust tagging apparatus, such as such as electronic device, mobile electronic device, or the like. The robust tagging apparatus can include a processor and computer readable medium as disclosed herein. At step 525, preprocessed electronic text can be transmitted to the robust tagging apparatus. After the construction of the phrase dictionary with the prefix tree including clustering structures and token lexicon, the robust tagging apparatus can be used, for example in communication with the storage device of the robust tagging system, to implement a robust tagging of the preprocessed text.

The apparatus can be configured to receive one or more textual utterances or communications, normalize, and tokenize them in a similar way in which the raw named entities were preprocessed into named entities in the dictionary, in order to then detect one or more named entities from the dictionary in textual utterances. For each resulting token, the corresponding entry can be retrieved from the lexicon, if available. Otherwise, information similar to a lexicon entry can be generated on-the-fly as similarly disclosed herein.

At step 530, the apparatus and the storage device, while in communication with each other, robustly detect matches between the electronic text transmitted to the apparatus and named entities in the prefix tree and mapped with the token lexicon. Once the apparatus receives one or more textual utterances, normalizes and tokenizes them, the apparatus communicates with the storage device to robustly detect matches between the tokenized one or more textual utterances and the named entities of the storage device. Matching between the apparatus and storage device can include a detection of multiple matches in a textual sentence of named entities from a very large dictionary of candidate entities, such that the matches often overlap and any word from the candidate named entities can appear in a slightly different form in the sentence (such as due to source or translation errors).

In order to achieve this, the method can utilize a beam traversal with a partial solution set of a configurable size on the prefix tree. A custom similarity measure can be used for comparisons that occur at sequentially traversed nodes in the prefix tree. This can facilitate an exhaustive detection (for example when the partial solution set size is unlimited) of all matches of all named entities containing similar tokens at any position, while being independent and supporting different custom similarity measures. Similarly, in another embodiment, the partial solution set size can be limited to facilitate a faster search at the expense of the comprehensiveness.

During the beam search on the prefix tree, the current node can check in order to identify whether a subset of its children match the next token as similarly disclosed step 515, except that no missing children can be added during search. For a given depth, the corresponding token encodings can be retrieved from the lexicon or generated on-the-fly and applied successively to select the most appropriate cluster on the deepest level in its local multi-level harmonized clustering structure. If no such path of clusters exists, the search can be aborted on this branch. In certain embodiment, within the deepest cluster, a full sequential search can be done using the given similarity measure to select a subset of children. In certain embodiments, the children in the deepest cluster are ordered by some relevant criterion (such as the number of named entities which contain the token, the number of accesses, an intrinsic value, and the like) and the sequential search can be aborted when a criterion is met (such as the relevance drops below a predetermined level or a sufficient number of children are found). In certain embodiments, additional limiting parameters can be set to further constrain the scope of the beam search and the duration of the tagging. However, any such limitation can further reduce the number of matches.

For example, where a multi-level, harmonized clustering is not used and where certain parents can easily have 1,000 children, a naïve selection of a subset of the children can require $O(1,000)$. Conversely, where a multi-level, harmonized clustering with, for example, two appropriate encoding functions capable to construct 10 clusters of 10 clusters each is used, the search complexity can be reduced to $O(1+1+M)$, where M is ideally of a similar magnitude with 10, which can improve the performance of the tagging process.

After the detections are made, a set of potentially overlapping and competing matches and associated tags can be collected. Each tag can be represented by the label information associated with the named entity whose identifying part (such as alias) was matched in the user utterance by using the robust matching.

At step 535, the apparatus tags the electronic text based on the matching between the electronic text transmitted to the apparatus and named entities contained in the prefix tree and mapped with the token lexicon. Once the set of potentially overlapping and competing matches and associated tags is collected, a partial disambiguation occurs. The partial disambiguation can be used to ensure that a subset of a high-confidence can be selected from the full set of variable quality and possibly competing tags (for example corresponding to all possible matches). The named entities in the storage device are not ambiguous by definition. The partial disambiguation selects a coherent, smaller, high-confidence subset from a larger set of possibly overlapping tags (for example corresponding to all possible matches) of named entities that is most likely to be the one intended by the user. Partial disambiguation can also include a computation of a confidence level of match detection, filtering out of low confidence tags (matches), and ranking the remaining subset of tags (matches) according to certain criteria.

In certain embodiments, ranking criteria can include providing a score of each token match, for example, based on a weighted factor related to the position of the token in the named entity identifying part in order to favor tokens that appear later despite having lower raw match scores. Furthermore, a full disambiguation can be done using additional information related to the domain (such as commonsense reasoning data for the domain, graph density solutions, and the like).

At step 540, the apparatus applies the tags to the electronic text. Once the disambiguation (partial or full disambiguation) is complete, each textual utterance is tagged according to a final list of tags from step 535. The list of tags can be made available for further processing, for example, in a natural language processing pipeline. In certain embodiments, the matched entities produced from the partial disambiguation are replaced in the original sentence in order to correct errors, resulting in a ranked set of alternative sentence correction hypotheses. As such, textual utterance mistakes can be corrected such as with the highest ranked sentence correction hypothesis. In case of a full disambiguation, the matched named entities produced are replaced in the original sentence. Similarly, textual utterance mistakes can be corrected this way.

In certain embodiments, disambiguation of named entities can be done using a common sense reasoning approach. Named entities can be ambiguous since the same name can have many different meanings or variations. For example, "Washington" might refer to either a person name or a location. Current Named Entity Recognition (NER) tools and Named Entity Disambiguation (NED) tools can rely on common large text bodies, such as encyclopedias, Wikipedia, web search results, gazetteers, and the like which usually contain unstructured text, to disambiguate named entities. Errors and incorrect disambiguation due to the processing of uncertain text elements in less structured natural language documents can occur. In addition, although some of current approaches can look into the surrounding text of a named entity to solve its ambiguity, these approaches treated only the text of surrounding items rather than examining its meaning in the whole context to get useful information for the disambiguation task. For example, the single word "Paris" may both refer to "Paris, France" and "Paris, Texas". However, if the surrounding context contains the word "Seine River", it would be able to infer that the entity relates to "Paris, France" by considering the meaning of the context.

Figure 10:
FIG. 10 illustrates an example of a Named Entity Recognition (NER) result from a statistical NER system according to this disclosure.

A specific example of the NER issue with the text input can be illustrated as follows: "Show me more movies on Hulu about Tom Hanks in Apollo 13". FIG. 10 illustrates an example of a NER result returned by an existing statistical NLP tool that supports the NER task.

A common tool in NER can return a NER result as illustrated in the FIG. 10. In this result, three entities were identified, such as, "Hulu", "Tom Hanks," and "13" with "Hulu" categorized as a location type, "Tom Hanks" categorized as a person type, and "13" categorized as a number type. Although the result was able to properly categorize the types of "Tom Hanks" and "13" which are person types and number types, respectively, "Hulu" was incorrectly recognized and categorized as a location type, when it is actually the name of an organization or company in the field of online video entertainment. Also, a better result could be expected since "Apollo 13" is a title of a movie in which Tom Hanks is a main actor. Some current NER tools can ignore the context related to the movie domain even when Tom Hanks is identified as an actor. This information can be reasoned by using knowledge assertions represented in a knowledge base.

Making sense out of text is very important for NER and NED tools so that they can provide more information in order to properly identify entities. Human commonsense can include the ability to understand and infer things that computers cannot. Therefore, it can be important for the task of disambiguation if disambiguation relies on a structured and commonsense source of text knowledge.

The systems and method disclosed herein can deal with uncertainties in natural language by utilizing semantic knowledge assertions from a knowledge base to disambiguate entities. The systems and methods disclosed herein address types of ambiguity which include (1) names in text and (2) specific label of ambiguous text. For example, with names in text, "George Bush" and "G. Bush" can refer to the same entity. With specific labels of ambiguous text, depending on the context, the entity "George Bush" can be assigned the label as "President" rather than a general label "Person", or a wrong label "Location". To disambiguate named entities, commonsense knowledge from concepts in a contextual window frame can be extracted rather than using text directly. Furthermore, a new scoring model to rank entity candidate labels based on relevance score of the knowledge assertions can be used.

The systems and method disclosed herein generally relate to named entity recognition, and more particularly to named entity disambiguation in a natural language text by using commonsense knowledge and knowledge assertions inferred from the contextual information of the ambiguous named entities.

The disambiguation system leveraging commonsense knowledge can use an extensive knowledge base to disambiguate named entities in natural language documents and can utilize semantic data and knowledge reasoning mechanism from a commonsense knowledge base. Many NER tools can lack commonsense reasoning. Accordingly, the disambiguation system leveraging commonsense knowledge disclosed herein can make sense of textual information by using a knowledge base to mine additional knowledge for the entity disambiguation task. Commonsense knowledge bases can be open source knowledge-bases which are formed of a semantic network that has been useful for natural language processing and intelligent user interface. Common sense knowledge bases can be freely available databases containing commonsense knowledge and a multitude of nodes and edges. Common sense knowledge bases can be linked with a plurality of different semantic relations and can provide a practical commonsense reasoning tool-kit browser and an integrated natural-language-processing engine that can support many practical textual-reasoning tasks including topic generation, semantic disambiguation and classification, affect sensing, analogy making, and other context-oriented inferences.

Furthermore, using knowledge assertions of contextual information that are mined from concepts surrounding the ambiguous named entity can help to disambiguate multiple named entities in order to find a correct label for the entity. This can be accomplished by sliding a concept window frame cover over ambiguous entities input text and their surrounding contextual concepts. For each window frame, additional knowledge, derived from the knowledge base, can be collected to calculate new scores for the ambiguous entities. These ambiguous named entities can be verified and reassigned new labels if necessary depending on the semantic scores they take.

Figure 11:
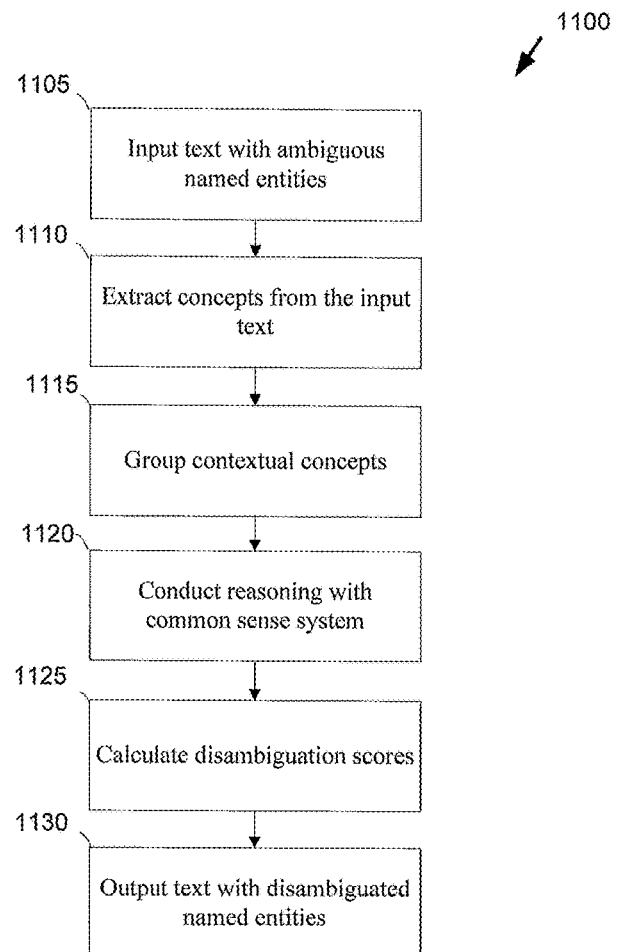
FIG. 11 illustrates a disambiguation process according to this disclosure.

FIG. 11 illustrates a disambiguation process 1100 according to this disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example is implemented by a processor in, for example, a mobile station.

At step 1105, text can be inputted into a disambiguation system leveraging commonsense knowledge. The text can include ambiguous named entities. At step 1110, the disambiguation system leveraging commonsense knowledge can extract concepts from the input text. The input text with ambiguous entities can be preprocessed to remove stopwords and punctuations before the step of concept extraction.

For example, the input text with ambiguous named entities can be transmitted to the disambiguation system leveraging commonsense knowledge, such as text that says "Show me more movies on <Hulu> about <Tom Hanks> in Apollo <13>". Stop-words and punctuations that are less important to the whole meaning of the sentence can be removed.

The disambiguation system leveraging commonsense knowledge can determine relevant concepts of specific word(s) in the sentence. For example, the disambiguation system leveraging commonsense knowledge can return different concepts for a specific word, such as the word "Apollo," which can be matched to both concepts "Apollo" and "Apollo 13". A function can be implemented that can select the best concept from a set of candidate concepts matching the same input word. Typically, the concepts directed to a great amount of words and having higher returned score from a knowledge base can more often be used. Preprocessing the text input and extracting concepts can generate input text including concepts as follows:

"[Show me] [movies] [Hulu] [Tom Hanks] [Apollo 13]"

In certain embodiment, specific entities can be checked to determine if name categories (labels) have been assigned to them. For example, "Tom Hanks" can be labeled with the person category. The named entity can be matched to a name category hierarchy in order to get more relevant name categories which can more specifically fit with the entity rather than the assigned one.

Figure 12:
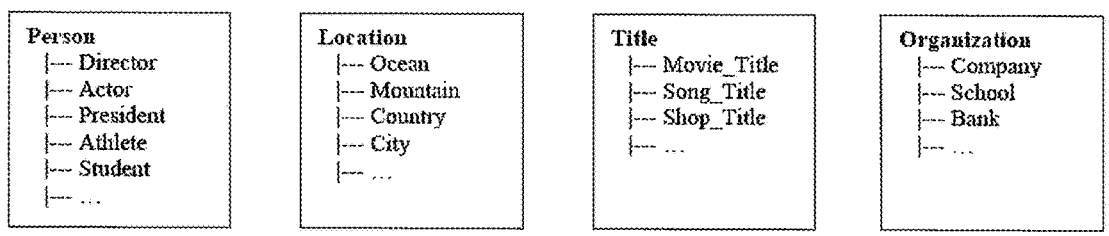
FIG. 12 illustrates an example diagram of name category (label) hierarchies according to this disclosure.

FIG. 12 illustrates an example diagram of name category hierarchies according to this disclosure. The embodiment of the hierarchies shown in FIG. 12 is for illustration only. Other embodiments could be used without departing from the scope of the present disclosure.

Category hierarchies can be built from a predefined set of concepts which were classified. Category hierarchies can subsequently be updated with new concepts mined from the knowledge base through a verification process.

After associating a named entity with new labels, the ambiguous entity can have additional candidate labels. For example, the entity "Tom Hanks" can have different names such as <Tom Hanks, Person>, <Tom Hanks, Actor>, <Tom Hanks, President>, and the like.

At step 1115, the disambiguation system leveraging commonsense knowledge can group conceptual concepts with ambiguous entities in order to extract more relevant knowledge or information from the knowledge base. Because consecutive words in a natural language sentence can be in a similar context or have close relations, concepts that may surround ambiguously named entities can be grouped into the same context. To ensure that all concepts and entities are covered, a contextual window of concepts with a predefined size (e.g. size=3, 5, 7 . . . ), which slides from the beginning to the end of the input text, can be used. For each snapshot in which the window contains the ambiguous entity, additional knowledge or information from surrounding concepts of the ambiguous entity can be collected to calculate scores.

FIG. 13 illustrates an example of a concept window which can be used to extract relevant knowledge or information from a sentence according to this disclosure. The embodiment of the concept window shown in FIG. 13 is for illustration only. Other embodiments could be used without departing from the scope of the present disclosure As illustrated in FIG. 13, the ambiguous entity "Tom Hanks" appears in two consecutive concept window frames, such as the second window 1304 and the third window 1306 (but not the first window 1302). All the concepts in these windows can be used to extract relevant knowledge assertions from a knowledge base.

At step 1120, the disambiguation system leveraging commonsense knowledge infers new commonsense knowledge. The disambiguation system leveraging commonsense knowledge can be optimized to make practical context-based inferences over real-world texts and can be readily applied to any textual input for query expansion or determining a semantic similarity.

The disambiguation system leveraging commonsense knowledge can make common sense relevant assertions that can be useful for determining a new label for an ambiguous entity. Relevant assertions can be linked and interchangeably inferred via a set of semantic relations and concepts. The disambiguation system leveraging commonsense knowledge can group these relation types into various sematic relations including weakly semantic relations (such as 'LocationOf', 'IsA') or strong semantic relations (such as 'PropertyOf', 'MotivationOf').

In certain embodiments, the disambiguation system leveraging commonsense knowledge uses a knowledge inference library, which can be built on top of the knowledge base for reasoning by analogy and for making associations over semantic networks, including common sense networks and databases. A knowledge inference library can be used to find related concepts, features, and relation types in any knowledge base that can be represented as a semantic network.

The knowledge inference library can include functions to allow a disambiguation system leveraging commonsense knowledge to query relevant concepts, acquire more relations, and make assertions if an item of information is true. Moreover, the disambiguation system leveraging commonsense knowledge can find similar concepts or relations and the like. By analyzing each concept in the window frame, as illustrated FIG. 13, a commonsense knowledge base can be used to collect more relevant knowledge assertions. The disambiguation system leveraging commonsense knowledge can use a mechanism to filter out which knowledge assertion and additional concepts are important to the context.

FIG. 14 illustrates examples of common sense knowledge that are extracted from a common sense knowledge base according to this disclosure. The embodiment of the common sense knowledge shown in FIG. 14 is for illustration only. Other embodiments could be used without departing from the scope of the present disclosure.

As a common sense data can be relevant to the concept "Hulu" and "Apollo 13". These assertions can be evaluated and used to identify new entity labels or categories.

At step 1125, the disambiguation system leveraging commonsense knowledge calculates and ranks entity disambiguation scores. For each ambiguous named entity (ANE), the disambiguation system leveraging commonsense knowledge can calculate a new score corresponding to each candidate label (CLabel) in search of a better label fit. The score calculation can use derived information from the knowledge base for all concepts and ambiguously named entities in the same window. Specifically, disambiguation system leveraging commonsense knowledge can look into each sliding window containing the ambiguously named entity and process all concepts in that window frame. The disambiguation system leveraging commonsense knowledge can collect knowledge assertions (KA) corresponding to these concepts from the knowledge base. Since each concept can contain many knowledge assertions that are less relevant or in different languages, the disambiguation system leveraging commonsense knowledge can implement a filter that can only retain assertions which are close to the context of the concept windows based on its relevance scores. Accordingly, the disambiguation system leveraging commonsense knowledge can provide a set of selected knowledge assertions for concepts in the window frame (such as $KA_{concepts}$). Similarly, the disambiguation system leveraging commonsense knowledge can collect a set of knowledge assertions corresponding to the entity candidate label (such as $KA_{CLabel}$) for the score calculation.

The disambiguation system leveraging commonsense knowledge can also measure a similarity between the ambiguous named entity (ANE) with its label candidates CLabel through the score_assertions function that can determine how assertions are relevant to each other between two sets $KA_{concepts}$ and $KA_{CLabel}$. For each context window frame w, the score of the ambiguous named entity with a specific candidate label CLabel$_j$ can be calculated according to Equation 1:

$$\text{score}(ANE, CLabel_j)_w = \sum_{i=1,j=1}^{C,L} \text{score\_assertions}(KA_{concepts_i}, KA_{CLabel_j}) \quad (1)$$

The new score and label of a named entity in the specific concept window frame w can be determined by Equations 2 and 3:

$$LabelScore(ANE)_w = \max_{j=1 \to L} \text{score}(ANE, CLabel_j)_w \quad (2)$$

$$Label(ANE)_w = \arg\max_{j=1 \to L} \text{score}(ANE, CLabel_j)_w \quad (3)$$

Since an ambiguous named entity ANE can belong to different concept windows depending on its frame size, the disambiguation system leveraging commonsense knowledge can evaluate the final score of that entity with the selected label CLabel over all containing window frames as its highest returned score. Thus, the new label for that entity can be determined according to Equation 4:

$$Label(ANE) = \arg\max_{w=1 \to W} \text{score}(ANE, CLabel)_w \quad (4)$$

For example, from FIG. 15, suppose "Tom Hanks" is assigned a label of Person in the second window 1204 with a score of 0.9823 and its label and score respectively for the third window 1206 is Actor and 0.9985. Then, the entity "Tom Hanks" will take the new label as Actor.

FIG. 15 illustrates an example of an expected output of the disambiguation process according to this disclosure. The embodiment of the output of the disambiguation process shown in FIG. 15 is for illustration only. Other embodiments could be used without departing from the scope of the present disclosure.

As illustrated in FIG. 15, the disambiguation system leveraging commonsense knowledge can provide an output of the disambiguation process in which previously determined named entities are reassigned more correct labels and new labels are created for unidentified entities. In this case, "Apollo 13" is assigned the label "Movie Title."

In certain embodiments, the disambiguation system leveraging commonsense knowledge implements different methods to vary flexibly parameters during the calculation in order to maximize the score of the entity with its closest new label.

At step 1130, the disambiguation system leveraging commonsense knowledge outputs text with the disambiguated named entities.

Certain embodiments of present disclosure are geared towards accurately detecting erroneous fragments in the output of an off-the-shelf automatic speech recognition (ASR) system. Typically, errors in the ASR output can be limited to small fragments of the output since most parts of user input get correctly translated. As a result, it can be beneficial to correct only those fragments that are erroneous in nature. Hence, identifying the erroneous parts of the ASR output can be crucial for correcting and recovering the user input accurately. The following system is designed to work with ASR systems that are configured with the correct acoustic and language models.

ASR systems can output multiple hypotheses (alternatives) of the user input. This disclosure uses the information present in these multiple hypotheses to identify erroneous fragments in the output. Since each hypothesis can be a translation of the same user input, all the hypotheses from the ASR system can be nearly identical. However, they can differ only in regions where the ASR is uncertain about the user input. Embodiments of the present disclosure identify these regions of uncertainty at which the hypotheses can differ by performing an optimal alignment of the hypotheses. While it can be possible to construct an optimal alignment of a pair of hypotheses (n=2) in polynomial time, constructing optimal alignment of multiple hypotheses (n>2) may not be possible in polynomial time since it is an NP-hard problem. As a result, procedures can be adapted that are specifically developed to construct multiple alignments of biological sequences for aligning hypotheses in the ASR output. In order to use a multiple sequence alignment procedure developed for biological sequences, the substitution matrix that gives the cost of substitution, insertion, and deletion can be constructed for characters in the given language. Certain embodiments also include a method for learning these substitution matrices automatically from data. Next, a consensus sequence that indicates all characters occupied in each position in the alignment can be calculated. Positions in the consensus sequence that have multiples characters can indicate regions of uncertainty or error. The incorrect regions can then be recognized by identifying all those words that consist of positions with different characters in the consensus sequence.

In certain embodiments, the substitution matrix is constructed such that a substitution with words that are spelled similarly are not penalized to account for spelling errors in the ASR output. In certain embodiments, the system and method described herein also is used to align incomplete or incorrectly spelled words like "textlish" to detect regions or mismatch or uncertainty. In certain embodiments, if the similarity between two words is more than a given threshold, then their substitution score is considered 0, such as there is no penalty if the alignment procedure aligns these words together.

In certain embodiments, word boundaries are detected and the individual words are treated as atomic units for alignment as opposed to individual characters.

In certain embodiments, the text in the original hypotheses is converted into its corresponding phonetic encoding using an encoding like Soundex or Double Metaphone and the resulting phonemes are aligned. In certain embodiments, words that sound similar are typically aligned with each other. The substitution matrix is constructed such there is no penalty for aligning words that sound similar.

In certain embodiments, uncertain words are scored to estimate the amount of error when in-domain data is available for training n-gram language models. The uncertain words are scored based on the probability along with their context (words or n-grams to the left and right) as computed using an n-gram language model (n>=2). Larger n can use a lot of training data as well as efficient smoothing for accurate scores.

Certain embodiments of the present disclosure are used to detect regions of mismatch in a given set of strings in any language. The substitution matrix for the alignment procedure is modified accordingly.

Certain embodiments of the present disclosure are geared towards systems and methods that accurately detect erroneous fragments in the output of any off-the-shelf ASR system. Typically, errors in the ASR output can be limited to small fragments of the output since most parts of the user input get correctly translated. As a result, it can be beneficial to correct only those fragments that are erroneous in nature. Hence, identifying the incorrect parts of the ASR output can be crucial for correcting and recovering the user input accurately.

ASR systems can output multiple hypotheses of the user input. Embodiments of the present disclosure use the information present in these multiple hypotheses to identify incorrect fragments in the output. Since each hypothesis can be a translation of the same user input, all the hypotheses from the ASR system can be nearly identical. However, they can differ only in regions where the ASR is uncertain about the user input.

Consider the following example ("Example 1"). User input: "I want to watch Seinfeld". ASR output: Hypothesis 1: "I want too watch Seinfeld", Hypothesis 2: "I want to wash Seinfeld" and Hypothesis 3: "I want two watch Seinfeld". In this example, since the hypotheses can differ in word positions 3 and 4 in the ASR output, it can be possible to conclude that the ASR system has trouble correctly translating the user input corresponding to these positions. However, since the translated output can be the same for the remaining positions in all the hypotheses, it can indicate the higher probability of correct translation in those regions. The uncertain regions in a given hypothesis can be identified only after comparing them to the remaining hypotheses in the output. Without the comparison, it may not always be possible to identify these incorrect fragments. It might not be difficult to detect errors in hypotheses 1 and 3 since the fragments "too watch" and "two watch" are not grammatically correct. However, since the fragment "to wash" in hypothesis 2 is grammatically correct by itself, it might not get identified as an erroneous fragment in the absence of comparison to other hypotheses. This example demonstrates that there can be useful information in the multiple hypotheses of the ASR output, which could be used effectively for detecting errors.

Figures 16, 17:
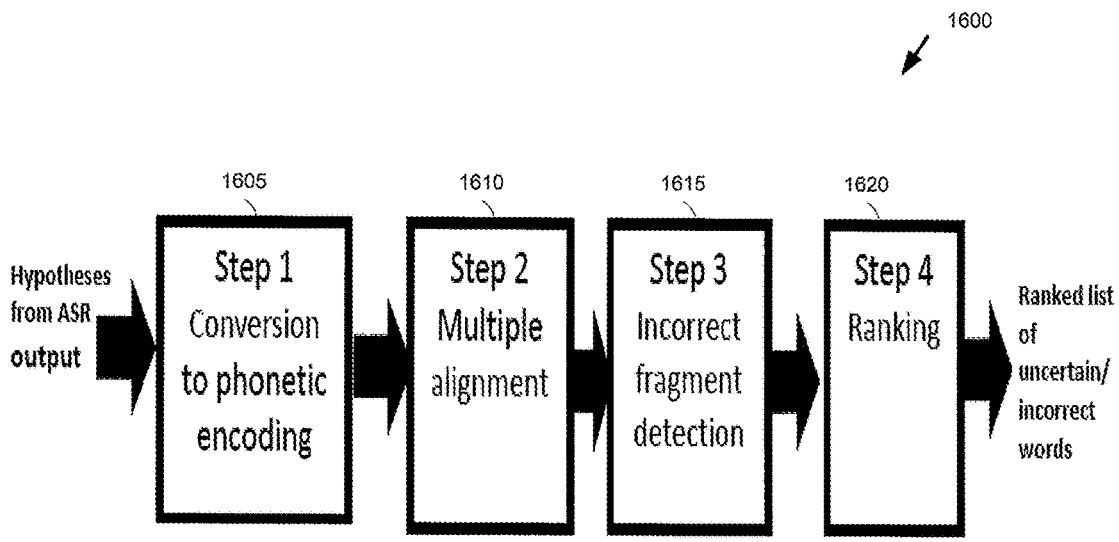
FIG. 16 illustrates an example method of multiple hypotheses alignment according to this disclosure.
FIG. 17 illustrates an example optimal alignment according to this disclosure.

Embodiments of the present disclosure illustrate methods and systems for detecting errors in the ASR output. FIG. 16 illustrates an example method 1600 of multiple hypotheses alignment according to this disclosure. The embodiment of the process 1600 shown in FIG. 16 is for illustration only. Other embodiments could be used without departing from the scope of the present disclosure.

In Step 1605, the system, such as the system processor in the client device, converts the ASR hypotheses into their corresponding phonemes using a phonetic encoding like Soundex or Double Metaphone. The conversion to phonemes can be useful for aligning words like "friend" and "fringe" together, which do not get aligned when raw text is used for alignment. A conversion step can also help aligning words like "cnn" and "seen" together. Conversion of text output to corresponding phonemes for subsequent alignment can be one of the novelties of the proposed disclosure.

In certain embodiments, step 1605 is skipped and the method proceeds to the alignment of hypotheses using the corresponding text. For example, words like "we" and "wii" can align better when they are not converted into their corresponding phonemes.

Figure 18:
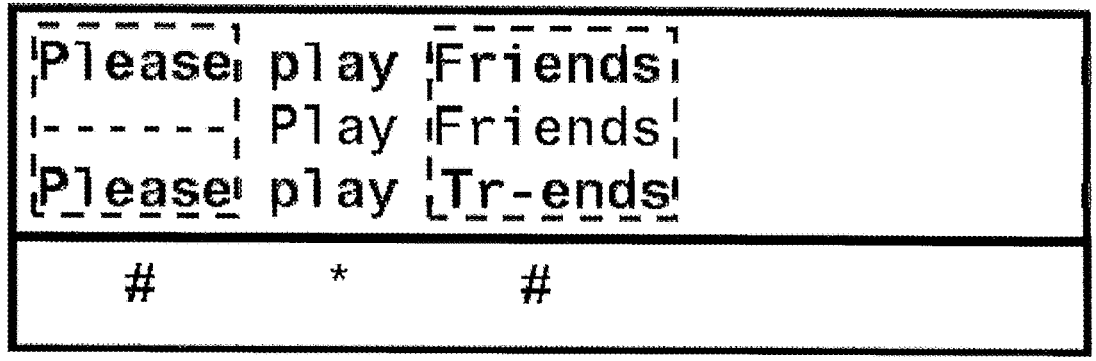
FIG. 18 illustrates an example alignment of the corresponding phonemes for a different example according to this disclosure.

In step 1610, the system, such as the system processor in the client device generates the most optimal alignment of phonemes or raw text that results in the least number of edits or changes necessary to convert one hypothesis into another. Each individual character/phoneme including an empty space can be treated as an atomic unit for alignment. Optimal alignment of a pair of strings can be obtained using dynamic programming by optimizing the Levenshtein distance. For optimal alignment of three or more strings containing text or phoneme characters, there can be no exact procedure that runs in polynomial time since this is an NP-hard problem. This problem can be solved using a combinatorial problem by adapting a multiple sequence alignment (MSA) procedure that is specifically developed to align multiple biological sequences. Certain embodiments of the present disclosure adapt the MSA procedure for aligning the ASR hypotheses efficiently. Specifically, the substitution matrix that consists of scores for replacing one character with another can be constructed accordingly. The substitution matrix can be learned from a training set that consists of pairs of user input and the corresponding ASR translation. Certain embodiments of the present disclosure illustrate that the system, such as the system processor in the client device can learn, without user intervention, the substitution matrix. That is, the system, such as the system processor in the client device is configured to automatically learn the substitution matrix. FIG. 17 illustrates an example optimal alignment according to this disclosure. FIG. 18 illustrates an example alignment of the corresponding phonemes for a different example according to this disclosure. The embodiments of the alignments shown in FIGS. 17 and 18 are for illustration only. Other embodiments could be used without departing from the scope of the present disclosure. Embodiments of the present disclosure also supports insertion and deletion of characters in the alignment.

Figure 19:
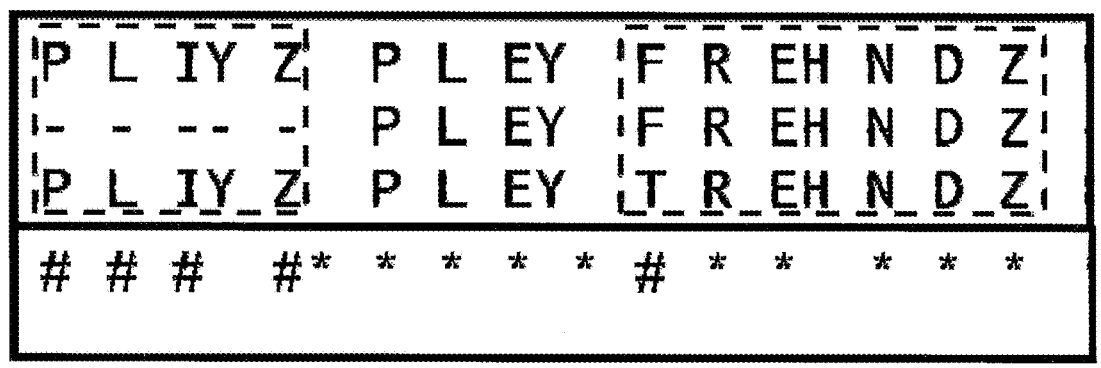
FIG. 19 illustrates an example optimal alignment in which words are used as atomic units for the alignment purpose according to this disclosure.

FIG. 19 illustrates an example optimal alignment in which words are used as atomic units for the alignment purpose according to this disclosure. The embodiment of the alignment shown in FIG. 19 is for illustration only. Other embodiments could be used without departing from the scope of the present disclosure In certain embodiments, alignments are performed on both original text and their corresponding phonemes.

In certain embodiments, word boundaries are detected and individual words are treated as atomic units for the alignment.

In certain embodiments, the hypotheses are aligned by performing multiple pairwise alignments of different pairs of hypotheses, and then can align them iteratively.

In step 1615, the system, such as the system processor in the client device constructs a consensus sequence from the alignment. Each position in the consensus sequence can show all the characters that are present in that position in the alignment. Next, the system, such as the system processor in the client device analyzes the consensus sequence to identify regions of uncertainty in the hypotheses. A position in the consenses sequence that has a single character or a phoneme can indicate that the same character is present at that position in all hypotheses in the ASR output. As a result, the ASR can be confident of its translation of the corresponding user input at that position. Alternatively, a position in the consensus sequence that has multiple phonemes or characters can indicate the variability in the translation of the user input. These positions can be marked as uncertain and the corresponding words can be marked for correction.

In certain embodiments, alignments can be obtained from raw text as well as the corresponding phonemes as input to this step. Consensus sequences can be constructed for both alignments and regions of uncertainty can be detected from both sequences. All unique uncertain sequences detected from both alignments can be kept, while duplicates are discarded.

When in-domain data is available, the system, such as the system processor in the client device continues with step 1620 to score uncertain words detected in the previous step. In step 1615, the system, such as the system processor in the client device can detect several possibly incorrect words in the ASR output. In order to rank these words in the order of importance, the system and methods disclosed herein can calculate a score that represents the uncertainty for each candidate word. This score can be computed using the n-gram model trained on an in-domain corpus similar to the Google N-Gram corpus or the Microsoft N-Gram corpus. The n-gram model can give the probability of observing the candidate word in the corpus. The value of 'n' can be 2 or more. Larger n can use a lot of training data as well as efficient smoothing techniques for accurate probability calculations. The disclosure also supports calculating probabilities along with the context of the word. Essentially, n-gram probability can be calculated by including the words or n-grams preceding and succeeding the candidate word along with the word itself. For the uncertain words "wash" and "watch" in the example above, n-gram probabilities can be calculated "too watch Seinfeld", "to wash Seinfeld", and "two watch Seinfeld." Candidate phrases that have lower probabilities can be less likely to be seen in the training corpus, and hence are more likely to be incorrect. As a result, candidate phrases can be placed at the top of the list of uncertain fragments that are output. The scored list can be sorted in ascending order of the probability score. In certain embodiments, different scoring techniques like using a statistical parser to score candidate words can be used.

Embodiments of the present disclosure provide systems and methods for learning the substitution matrix. Certain embodiments of the present disclosure illustrate that the system, such as the system processor in the client device can learn, without user intervention, the substitution matrix. That is, the system, such as the system processor in the client device is configured automatically learn the substitution matrix. The substitution matrix can be constructed using training data before the system described above is used for detecting errors in ASR output. The training data used for learning substitution matrix can consist of user input to the ASR system and the corresponding ASR output. For each user input, a training pair consisting of user input and each of the ASR output can be created. These training pairs can then be given as input to the learning system to learn the substitution matrix. The system can learn three different substitution matrices, first for substitution of individual characters, second for substitution of phonemes, and third for substitution of words.

For each training pair, the learning system can construct a character-based pairwise alignment of sentences in the pair. For each pair of characters (char1, char2), the system can calculate the number of times char1 is aligned with char2 (char1 and char2 could be the same) across all training pairs. Spaces and deletions can also be treated as individual units of alignment. Then the system, such as the system processor in the client device can normalize these counts by the total number of times char1 is seen (aligned) across all training pairs. The system can also construct a word-based pairwise alignment of the training pairs. As described herein, the system can calculate the number of times each word is aligned with another word (including itself) across all training pairs and can normalize the counts as described herein. The system can also construct a phoneme-based pairwise alignment of training pairs and can calculate the number of times each phoneme is aligned with another (including itself) across all training pairs and can normalize the counts accordingly. The system can save these counts to matrices appropriately. Since these matrices can be symmetric, such as score (unit1, unit2) is the same as score (unit2, unit1), only the upper triangle or the lower triangle of the matrix can be saved.

Although the present disclosure is described with an exemplary embodiment, various changes and modifications may be suggested to one skilled in the art. It is intended that the present disclosure encompass such changes and modifications as fall within the scope of the appended claims.

What is claimed is:
1. An electronic device comprising:
a storage device configured to store a plurality of named entities collected from a plurality of sources, wherein each of the named entities are tokenized into a common format of named entity tokens, wherein each of the named entities are associated with a label, and wherein each of the named entity tokens are one of a word or a syllable of a word; and
one or more processors configured to convert one or more textual communications from a natural language source into a computer readable format for reading and processing by the electronic device, the one or more processors comprising a tagging apparatus configured to:
receive the one or more textual communications,
identify each of the one or more textual communications,
tokenize the one or more textual communications into a common format of textual tokens corresponding to a prefix tree,
match, as a function of a selection of a cluster on a deepest level of a multi-level harmonized clustering structure of tokens, the textual tokens with one or more of the named entity tokens stored in the storage device, in order to assign the textual tokens to the labels associated with each of the named entities,
tag the one or more textual communications based on the matching between the textual tokens and the named entity tokens, in order to identify an intended meaning of each of the one or more textual communications, wherein the intended meaning of the received one or more textual communications are identified based on an extracted conceptual concept from the one or more textual communications,
identify the intended meaning of the one or more textual communications based on applying the tags to the one or more textual communications; and
replace an error of the one or more converted textual communications with the identified intended meaning of the one or more textual communications, when the error is detected.
2. The electronic device as set forth in claim 1, wherein the plurality of named entities comprise at least one of object names, names associated with objects or people, proper names associated with objects or people, titles, phrases, and a combination thereof.
3. The electronic device as set forth in claim 1, wherein the tagging apparatus is configured to apply the tags to the one or more textual communications in order to correct textual mistakes.
4. The electronic device as set forth in claim 1, wherein the tagging apparatus is configured to utilize a beam traversal with a partial solution set of a configurable size on the prefix tree using a custom similarity measure as comparisons occur at sequentially traversed nodes in the prefix tree in order to match the one or more textual communications with the plurality of named entities stored in the storage device.

5. The electronic device as set forth in claim 4, wherein the partial solution set comprises a limited size.

6. The electronic device as set forth in claim 1, wherein the tagging apparatus is configured to partially disambiguate at least one of the plurality of named entities matched with the one or more textual tokens to ensure that a subset of the plurality of named entities of a high-confidence are selected from a full set of plurality of named entities.

7. The electronic device as set forth in claim 1, wherein the tagging apparatus is configured to partially disambiguate at least one of the one or more named entities matched with the one or more textual tokens by filtering out at least one of the one or more named entities having a lowest confidence level of match detection.

8. The electronic device as set forth in claim 1, wherein the tagging apparatus is configured to partially disambiguate at least one of the one or more named entities matched with the one or more textual tokens by ranking confidence levels of at least two of the one or more named entities matched with the one or more textual tokens.

9. A method comprising:
converting, by one or more processors, one or more textual communications from a natural language source into a computer readable format for reading and processing by an electronic device;
receiving, by a tagging apparatus, the converted one or more textual communications;
identifying each of the one or more textual communication;
tokenizing the one or more textual communications into a common format of textual tokens corresponding to a prefix tree;
matching, as a function of a selection of a cluster on a deepest level of a multi-level harmonized clustering structure of tokens, the textual tokens with one or more named entity tokens stored in a storage device, in order to assign the textual tokens to labels associated with the named entity tokens, and wherein each of the one or more named entities is associated with a label;
tagging the one or more textual communications based on the matching between the textual tokens and the named entity tokens, in order to identify an intended meaning of each of the one or more textual communications, wherein the intended meaning of the received one or more textual communications are identified based on an extracted conceptual concept from the one or more textual communications;
identifying the intended meaning of the one or more textual communications based on applying the tags to the one or more textual communications; and
replacing an error of the one or more converted textual communications with the identified intended meaning of the one or more textual communications, when the error is detected.

10. The method as set forth in claim 9, wherein the one or more named entities comprise at least one of object names, names associated with objects or people, proper names associated with objects or people, titles, phrases, and a combination thereof.

11. The method as set forth in claim 9, further comprising applying the tags to the one or more textual communications in order to correct textual mistakes.

12. The method as set forth in claim 9, further comprising utilizing a beam traversal with a partial solution set of a configurable size on the prefix tree using a custom similarity measure as comparisons occur at sequentially traversed nodes in the prefix tree in order to match the one or more textual communications with the one or more named entities stored in the storage device.

13. The method as set forth in claim 12, wherein the partial solution set comprises a limited size.

14. The method as set forth in claim 9, further comprising partially disambiguating at least one of the one or more named entities matched with the one or more textual tokens to ensure that a subset of the one or more named entities of a high-confidence is selected from a full set of one or more named entities.

15. The method as set forth in claim 9, further comprising partially disambiguating at least one of the one or more named entities matched with the one or more textual tokens by filtering out at least one of the one or more named entities having a lowest confidence level of match detection.

16. The method as set forth in claim 9, further comprising partially disambiguating at least one of the one or more named entities matched with the one or more textual tokens by ranking confidence levels of at least two of the one or more named entities matched with the one or more textual tokens.

17. For use in an electronic device, a method comprising:
converting, by one or more processors, one or more textual communications from a natural language source into a computer readable format configured for reading and processing by the electronic device;
receiving the converted one or more textual communications by the electronic device, wherein the one or more textual communications comprises one or more named entities;
grouping, as a function of a selection of a cluster on a deepest level of a multi-level harmonized structure, concepts associated with the one or more name entities in order to extract relevant information from a knowledge base;
inferring relevant knowledge from the extracted relevant information from the knowledge base;
calculating and ranking the inferred relevant knowledge for the one or more named entities; and
identifying a relevant label based on the highest rank of the inferred relevant knowledge for each of the one or more named entities.

18. The method as set forth in claim 17, wherein the one or more textual communications comprises one or more ambiguous entities.

19. The method as set forth in claim 17, wherein the one or more textual communications are preprocessed to remove stop-words and punctuation.

20. The method as set forth in claim 17, wherein calculating and ranking the inferred relevant knowledge includes calculating a score based on the following function:

$$score(ANE, CLabel_j)_w = \sum_{i=1, j=1}^{C,L} score\_assertions(KA_{concepts_i}, KA_{CLabel_j})$$

wherein (ANE) represents an ambiguous named entity, (CLabel) represents label candidates, and (KA) represents knowledge assertions.

* * * * *